(12) United States Patent
Obolo

(10) Patent No.: US 10,849,332 B2
(45) Date of Patent: Dec. 1, 2020

(54) PRODUCE RIPENING SYSTEM AND APPARATUS

(71) Applicant: Christophe Obolo, New Milford, NJ (US)

(72) Inventor: Christophe Obolo, New Milford, NJ (US)

( * ) Notice: Subject to any disclaimer, the term of this patent is extended or adjusted under 35 U.S.C. 154(b) by 0 days.

(21) Appl. No.: 16/559,821

(22) Filed: Sep. 4, 2019

(65) Prior Publication Data

US 2020/0022378 A1 Jan. 23, 2020

Related U.S. Application Data

(63) Continuation-in-part of application No. 15/480,880, filed on Apr. 6, 2017, now Pat. No. 10,440,969.

(60) Provisional application No. 62/396,063, filed on Sep. 16, 2016.

(51) Int. Cl.
*B65D 5/68* (2006.01)
*A23B 7/152* (2006.01)
*B65D 85/34* (2006.01)

(52) U.S. Cl.
CPC .............. *A23B 7/152* (2013.01); *B65D 85/34* (2013.01)

(58) Field of Classification Search
CPC .... A23B 7/00; A23B 3/00; B65D 5/68; B65D 85/35; B65D 2205/00; B65D 51/16
USPC .......................... 206/521.15; 220/4.01, 367.1
See application file for complete search history.

(56) References Cited

U.S. PATENT DOCUMENTS

| | | | |
|---|---|---|---|
| 5,069,344 A * | 12/1991 | Dehart | B65D 5/4295 206/508 |
| 5,419,153 A | 5/1995 | Hartley | |
| 5,438,917 A | 8/1995 | Bolkestein et al. | |
| 5,460,841 A | 10/1995 | Herdeman | |
| 5,465,901 A | 11/1995 | Paine, Jr. | |
| 5,475,926 A | 12/1995 | Bolkestein et al. | |
| 5,531,158 A | 7/1996 | Perryman, Jr. | |
| 5,829,602 A | 11/1998 | St. John Danko | |
| 6,012,384 A | 1/2000 | Badalament et al. | |
| 6,074,676 A * | 6/2000 | Cadiente | B65D 5/4295 206/501 |
| 6,077,160 A | 6/2000 | Franaszek et al. | |

(Continued)

OTHER PUBLICATIONS

Mar. 6, 2019 Non-Final Office Action in U.S. Appl. No. 15/480,880.

*Primary Examiner* — King M Chu
(74) *Attorney, Agent, or Firm* — John H. Choi & Associates

(57) ABSTRACT

A system and apparatus ripen produce such as fruits and vegetables, and include a chamber having a plurality of chamber walls integrally coupled to a floor and forming an interior therein for retaining the produce; and a lid configured to be removably coupled with the chamber at an upper end thereof, the lid having: a top having: a top surface; and an underside surface; a plurality of underside walls extending downward from the underside surface and forming a plurality of cavities; a first aperture extending through the top surface and the underside surface and positioned within a first cavity of the plurality of cavities; and a second aperture extending through the top surface and the underside surface and positioned to not be in any of the plurality of cavities, wherein the first gas passing through at least the first and second apertures causes the produce to ripen.

20 Claims, 19 Drawing Sheets

(56) References Cited

U.S. PATENT DOCUMENTS

| | | | |
|---|---|---|---|
| 6,901,768 B1 | 6/2005 | Windecker | |
| 7,340,995 B2 | 3/2008 | Chiang et al. | |
| 7,650,835 B2 | 1/2010 | Stein | |
| 8,029,838 B2 | 10/2011 | Forsyth et al. | |
| 8,083,085 B2 * | 12/2011 | Sambrailo | B65D 1/22 |
| | | | 220/23.86 |
| 8,631,956 B2 | 1/2014 | Dowd | |
| 9,237,757 B2 | 1/2016 | Jeong | |
| 2003/0198714 A1 * | 10/2003 | Cadiente | B65D 43/162 |
| | | | 426/106 |

* cited by examiner ated to the patent.

PRODUCE RIPENING SYSTEM AND APPARATUS

CROSS-REFERENCE TO RELATED APPLICATIONS

The present application claims priority to U.S. Provisional Application No. 62/396,063, filed on Sep. 16, 2016, and U.S. application Ser. No. 15/480,880, filed on Apr. 6, 2017, each of which is incorporated by reference herein.

FIELD OF THE INVENTION

This invention relates generally to produce storage and ripening and relates particularly to a produce ripening system and apparatus for fast-paced ripening of produce that produce ethylene.

BACKGROUND OF THE INVENTION

Before the development of more efficient transportation we have today, produce such as fruits and vegetables were not transported very far to the place of consumption. Because the transportation distance and time of transport was not great, would-be consumers who lived a distance from the farm or orchard were able to obtain fresh ready-to-eat produce. However, those consumers could only obtain local produce due to the produce being perishable for long distance transport and thus, could not obtain a wide selection of fruits and vegetables. Therefore, the only fruits and vegetables available at all would be those that are "in season" at farms or orchards that were not too far away.

Since the development of shipping, it has become commonplace to transport nearly all kinds of fruits and vegetables great distances to consumers. From the consumer's point of view, this has led to an extremely wide selection of fruits and vegetables, and the breadth of the selection is maintained throughout the year.

Part of what makes this selection possible is that many fruits and vegetables are picked when they are not yet ripe. This permits shipping the produce in refrigerated trucks with the intention that the produce will ripen at a later time, particularly when shipping internationally in the case of fruits such as avocado and kiwi fruits. It is well known that cold temperatures inhibit ripening.

The science behind ripening of ethylene-producing produce is well documented. Such produce include apples, apricots, avocados, bananas, blueberries, cantaloupe, cherimoyas, cranberries, figs, green onions, guavas, grapes, honeydew, kiwifruit, mangoes, mangosteen, nectarines, papayas, passion fruit, peaches, pears, persimmons, plums, potatoes, prunes, quince and tomatoes, to name a few. These types of produce are ripened as a result of naturally occurring respiration in which ethylene, a ripening hormone, is produced and released. As ethylene converts starch into sugar, carbon dioxide ($CO_2$) is emitted as a by-product of respiration. Some ethylene producing produce also emit methane, usually late in the ripening process. Although ethylene is essential in ripening produce, carbon dioxide inhibits ripening and methane tends to promote over-ripening.

It is known in the industry to supply ethylene gas in ripening warehouses to help the produce ripen. It is also known to purge the ambient air about the produce to flush away carbon dioxide which is emitted by produce during ripening and which interferes with ripening. These methods are used prior to shipping produce to supermarkets in an attempt to have the produce ripe for sale at the grocery store. In many cases it is assumed that some of the ripening can happen in transit, and that some of the ripening may happen while the produce is in the store awaiting purchase. In some cases, however, produce bought at the grocery store are not ripe for immediate consumption. Thus, some of the ripening may happen in the home of the consumer, particularly in winter months because cold temperature inhibits ripening and this could happen in grocery store warehouses and when consumers travel back to their homes from grocery stores in cold weather. In addition, produce that are starting to ripen or soften are often squeezed by other consumers again and again, when they assess ripening and this practice causes bruising and browning of the pulp and provide consumers with low quality fruits.

Ripening in the home is not easy to get right. Many consumers are not aware of how to ripen produce correctly. Those consumers who are aware how to ripen produce correctly may nonetheless not have needed equipment and facilities to ripen the produce correctly. Finally, some prior art apparatus that is meant to assist a consumer in ripening produce does not work well for its purpose.

One way to ripen produce is simply to store it in open space until it has ripened. This has drawbacks. For example the produce may ripen on a day that is earlier or later than the day the consumer wished to make use of the produce. The consumer who wishes to guard against this problem will be forced to purchase produce on several different days, gambling that one or another days' worth of produce may happen to ripen on the desired day. This requires storage space for the batches of produce, and risks wasting some of the produce. Another drawback is that the ripening period is quite long.

A way to ripen produce faster is to store it in an enclosed container, sometimes in combination with a banana, which is known to produce ethylene at a higher rate. However, the produce will ripen unevenly due to the carbon dioxide and methane within the container, yielding much waste since bananas are over ripe and wasted in this process, and the subject produce may not ripen at all.

Thus, a system and apparatus for evenly and quickly ripening produce is needed.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

This invention relates generally to produce storage and ripening and relates particularly to a produce ripening system and apparatus for fast-paced ripening of produce that produce ethylene. The present invention assures that consumers buy hard or unripen produce to ripen in their homes within 48-60 hours, and also gives them produce that are well ripened and moist for consumption for several days when produce ripened by the present invention are refrigerated. Furthermore, the use of this invention eliminates the "hit or miss" shopping of produce when consumers look for a well ripe produce. In contrast to alternative ripening procedures, this invention does not use a banana or other fruits to help with the ripening process.

In one embodiment, the present invention is an apparatus for ripening produce, the apparatus comprising a chamber having a plurality of chamber walls integrally coupled to a floor and forming an interior therein for retaining the produce; and a lid configured to be coupled with the chamber at an upper end thereof, the lid having: a top having: a top surface; and an underside surface; a plurality of underside walls extending downward from the underside surface and forming a plurality of cavities; a first aperture extending through the top surface and the underside surface and positioned within a first cavity of the plurality of cavities; and a second aperture extending through the top surface and the underside surface and positioned to not be in any of the plurality of cavities; wherein a first gas passing through at least the first and second apertures causes the produce to ripen. At least one of the first and second apertures is between 1 to 3 mm in diameter. The apparatus of claim 1, wherein at least one of the first and second apertures is between 1 to 3 mm in diameter.

The first aperture is not centrally positioned within the first cavity. Alternatively, the first aperture is centrally positioned on the top surface. The second aperture is positioned near an external corner of a second cavity of the plurality of cavities. The first aperture is positioned substantially distant from the second aperture. The plurality of underside walls form two rows of cavities as the plurality of cavities. At least a second cavity of the plurality of cavities collects oils from the produce. The oils are collected from ethylene gas generated from the produce. The lid further comprises a plurality of side walls extending downward from the top. A first side wall of the plurality of side walls includes a groove for gripping the first side wall. The first cavity operates as a flow cell configured to transfer the first gas from within the apparatus to the atmosphere external to the apparatus. The at least one gas is carbon dioxide gas.

In another embodiment, the present invention is a system for ripening produce, the system comprising: a chamber having a plurality of chamber walls integrally coupled to a floor and forming an interior therein for retaining the produce which generates ethylene gas; and a lid configured to be coupled with the chamber at an upper end thereof, the lid having: a top having: a top surface; and an underside surface; a plurality of underside walls extending downward from the underside surface and forming a plurality of cavities; a first aperture extending through the top surface and the underside surface and positioned within a first cavity of the plurality of cavities; and a second aperture extending through the top surface and the underside surface and positioned to not be in any of the plurality of cavities; wherein a first gas passing through at least the first and second apertures increases a concentration of the ethylene gas in the system, thereby causing the produce to ripen. At least one of the first and second apertures is between 1 to 3 mm in diameter. The first aperture is centrally positioned on the top surface. The first cavity operates as a flow cell configured to transfer the first gas from within the system to the atmosphere external to the system. The first gas is carbon dioxide gas.

In a further embodiment, the present invention includes a method for ripening produce comprising: providing a chamber having a plurality of chamber walls integrally coupled to a floor and forming an interior therein; retaining the produce in the chamber; generating ethylene gas from the produce; and providing a lid configured to be coupled with the chamber at an upper end thereof, the lid having: a top having: a top surface; and an underside surface; a plurality of underside walls extending downward from the underside surface and forming a plurality of cavities; a first aperture extending through the top surface and the underside surface and positioned within a first cavity of the plurality of cavities; and a second aperture extending through the top surface and the underside surface and positioned to not be in any of the plurality of cavities; and passing a first gas through at least the first and second apertures, thereby increasing a concentration of the ethylene gas in the system, thereby causing the produce to ripen. At least one of the first and second apertures is between 1 to 3 mm in diameter.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
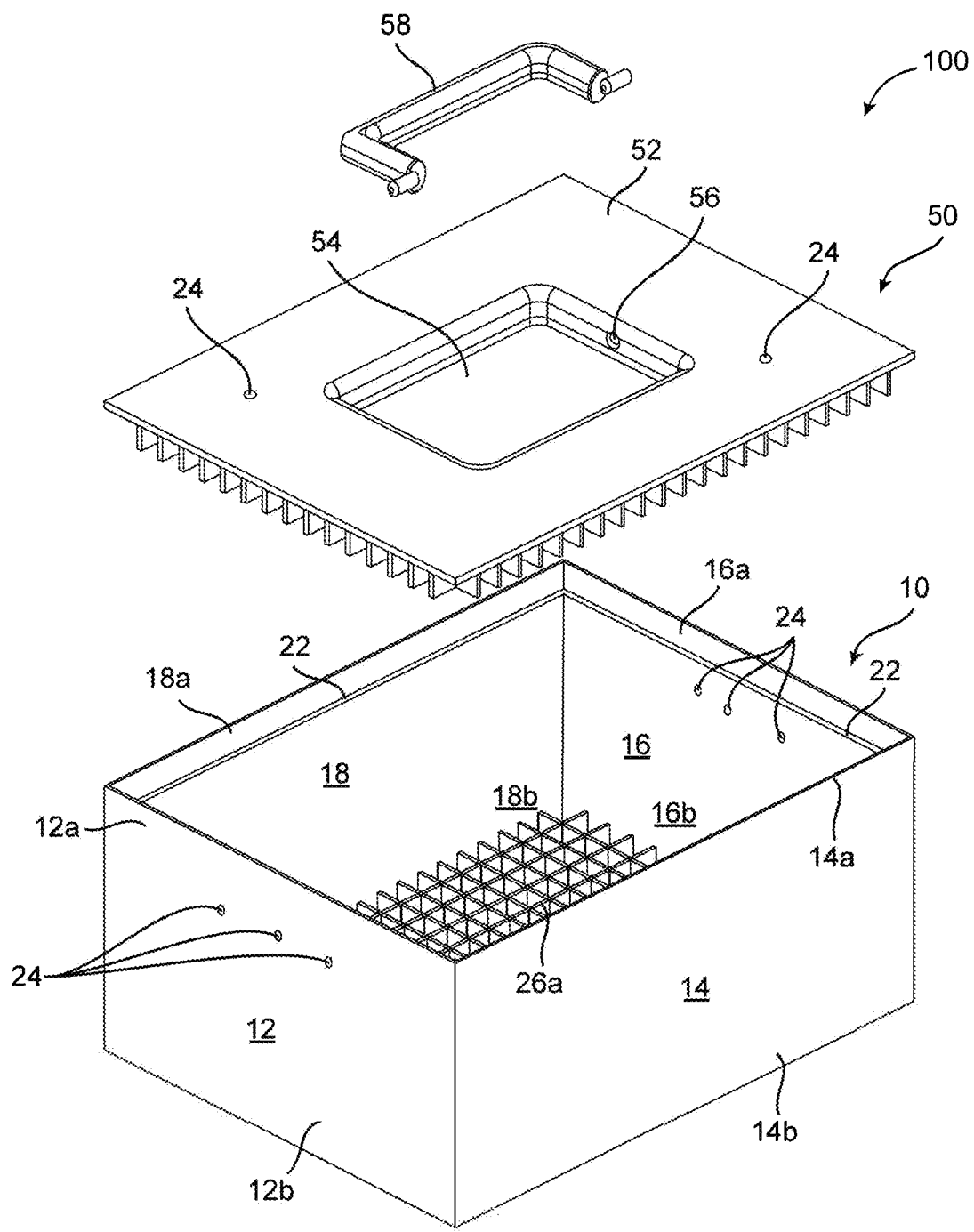
FIG. 1 is a top perspective exploded view of a first embodiment of an apparatus of the present invention.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE INVENTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

First Embodiment

Referring to FIGS. 1-9, a first embodiment of an apparatus 100 of the present invention is shown. In general, the apparatus 100 includes a chamber 10 and a removable lid 50.

Figure 2:
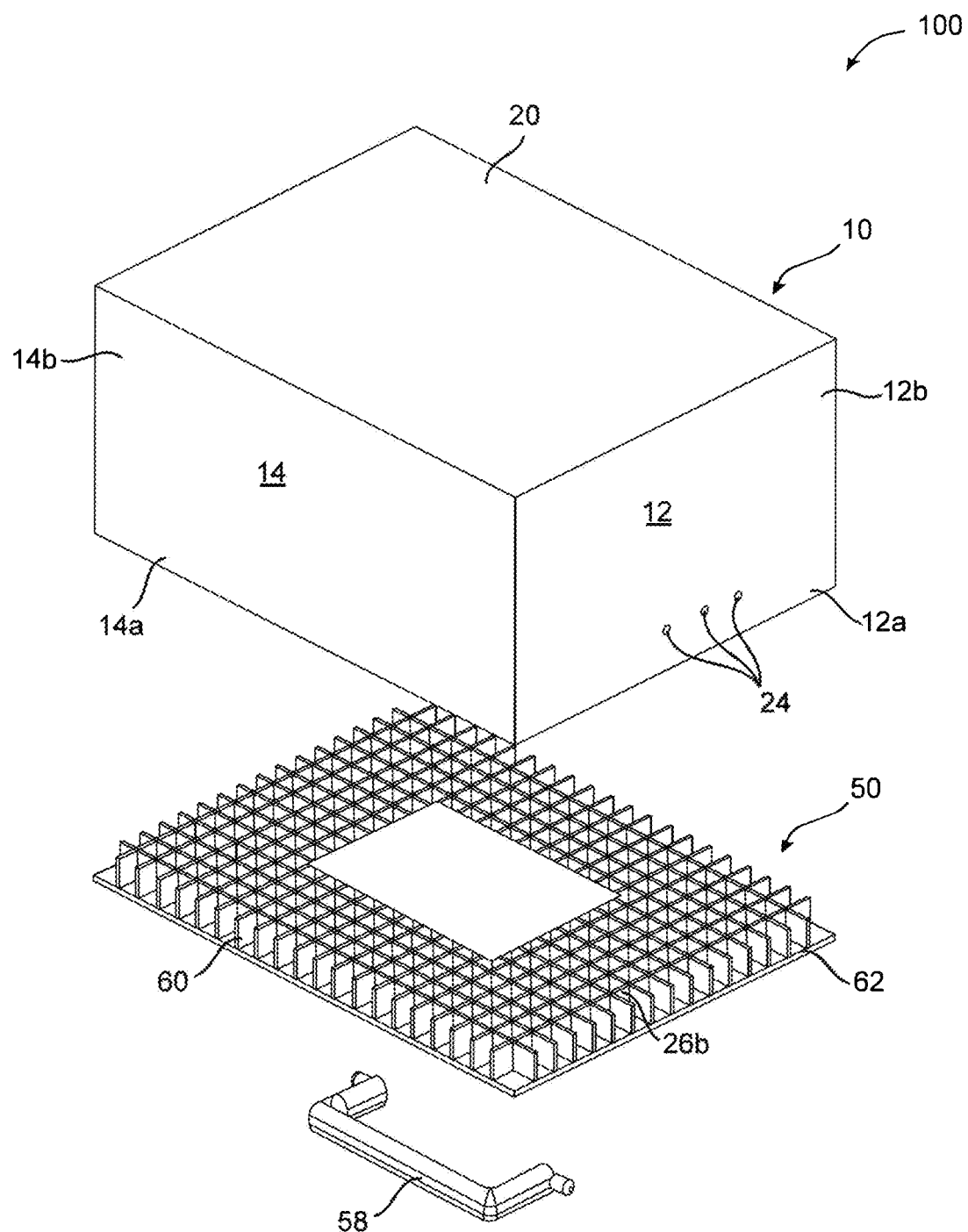
FIG. 2 is a bottom perspective exploded view of the apparatus of FIG. 1.

Referring to FIGS. 1 and 2, the chamber 10 includes a plurality of upright walls 12, 14, 16, 18 and a floor 20 coupled together to form a partial integral enclosure with an open top. In this embodiment, there are four walls but more or less walls could be included. Inner sides of each wall 12, 14, 16, 18 culminate at a top end thereof with an offset, forming an upper portion 12a, 14a, 16a, 18a, the upper portions 12a, 14a, 16a, 18a being less thick than lower portions of the walls 12b, 14b, 16b, 18b, thereby providing a substantially horizontally planar engagement area 22 along a perimeter of the chamber 10 where the upper and lower portions intersect. In this embodiment, the approximate dimensions of walls 12 and 16 are 200 mm wide and 127 mm in height, the approximate dimensions of walls 14 and 18 are 266 mm wide and 127 mm in height, and the floor 20 is approximately 266 m wide and 200 mm in length. However, these dimensions could be adjusted depending on the application.

Referring again to FIGS. 1 and 2, a plurality of apertures 24 are positioned on an opposing pair of walls 12, 16 near a top portion thereof. Here, three spaced apart apertures 24 are positioned on each wall 12, 16, each measuring 2 to 3 mm in diameter, but could be as small as 1 mm. Alternatively, so long as the positioning of the apertures remain at a top portion of the walls, the number of apertures and location from one wall to another could be adjusted as long as the total area of openings remains the same or substantially the same. For example, each wall 12, 14, 16, 18 could include a single aperture having a diameter of 3 to 4.5 mm.

Figure 9:
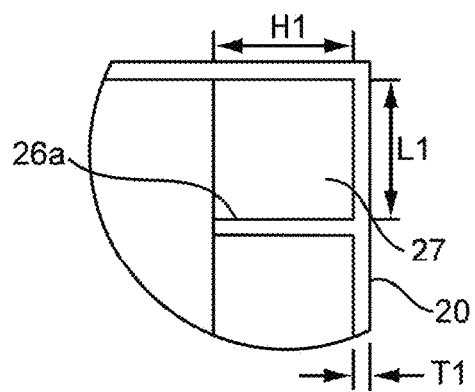
FIG. 9 is sectional view of F, shown in FIG. 7.

Referring to FIGS. 1, 2, 7 and 9, the floor 20 includes a plurality of first ribs or flanges 26a extending therefrom, forming grooves 27 therebetween. In this embodiment, each rib 26a is about 1.5 mm in thickness T1 and symmetrical in each in each direction, approximately 12.7 mm, i.e., length L1, width W1, height H1, as shown in FIG. 9.

Figure 3:
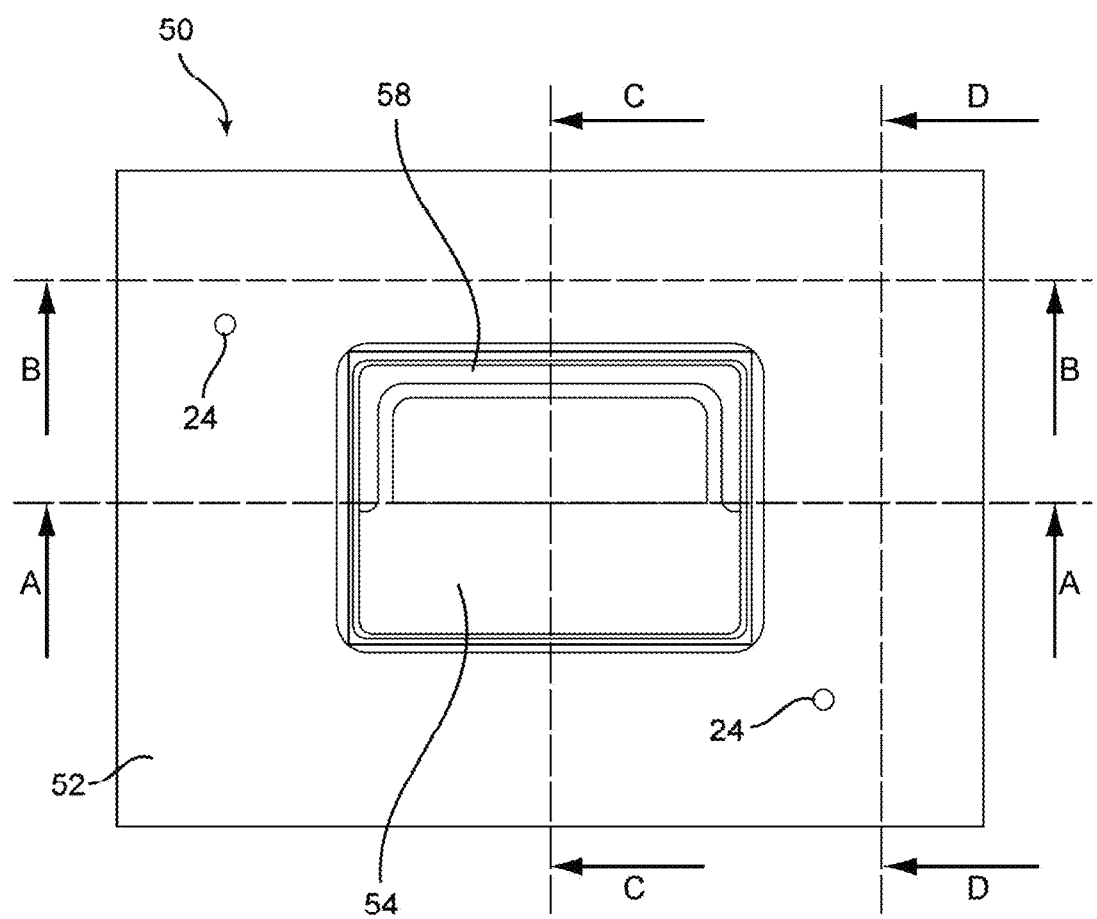
FIG. 3 is a plan view of a lid of the apparatus of FIG. 1.
Figure 4:
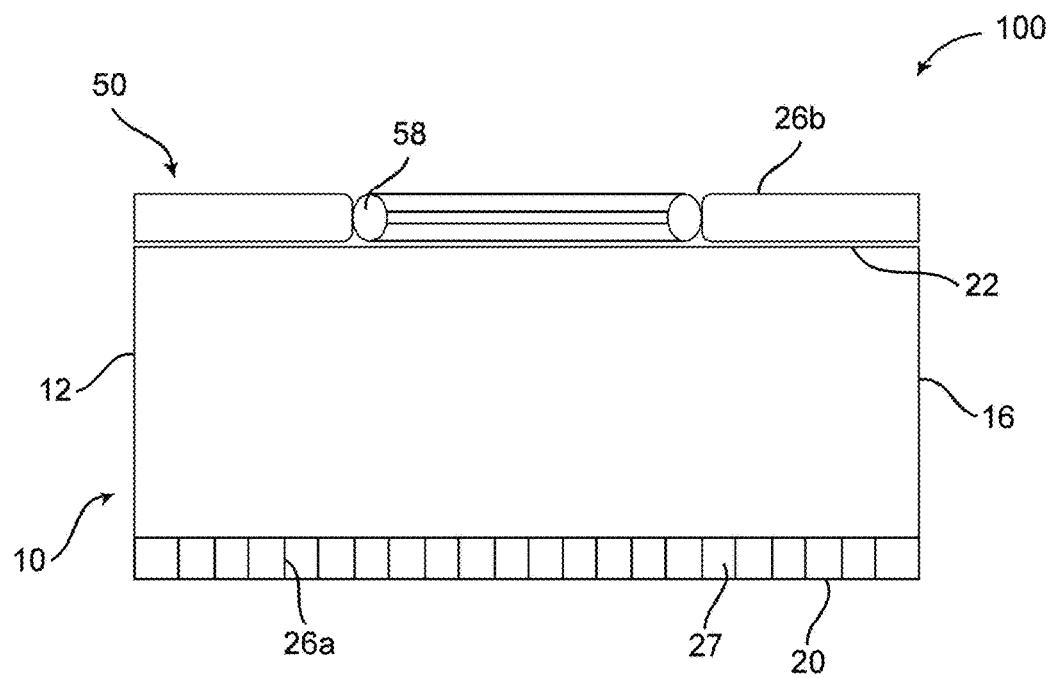
FIG. 4 is a sectional view of A-A, shown in FIG. 3, of the apparatus of FIG. 1 in an engaged state.
Figure 5:
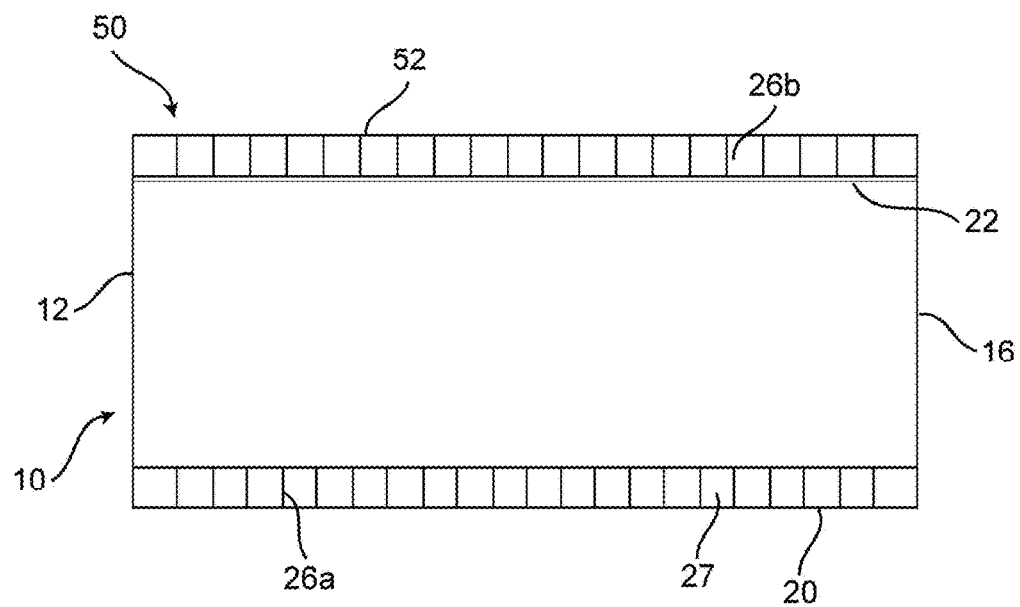
FIG. 5 is a sectional view of B-B, shown in FIG. 3, of the apparatus of FIG. 1 in an engaged state.
Figure 6:
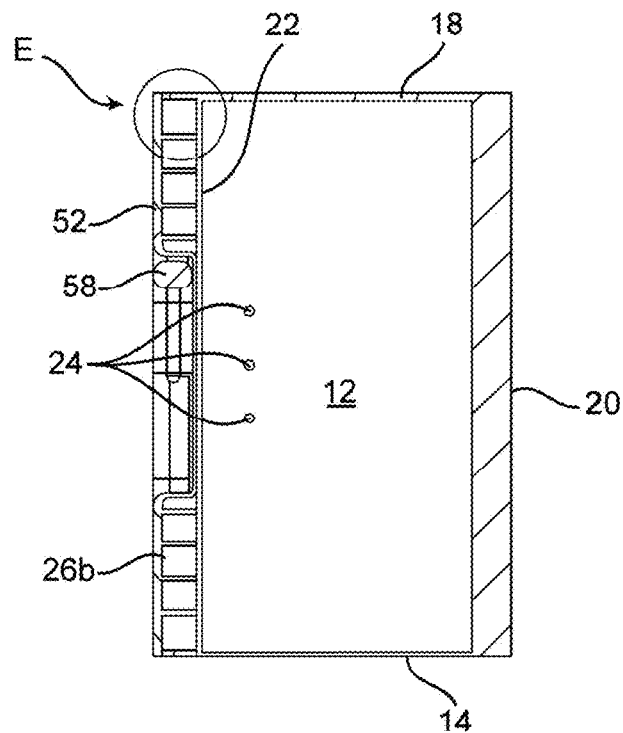
FIG. 6 is a sectional view of C-C, shown in FIG. 3, of the apparatus of FIG. 1 in an engaged state.
Figure 7:
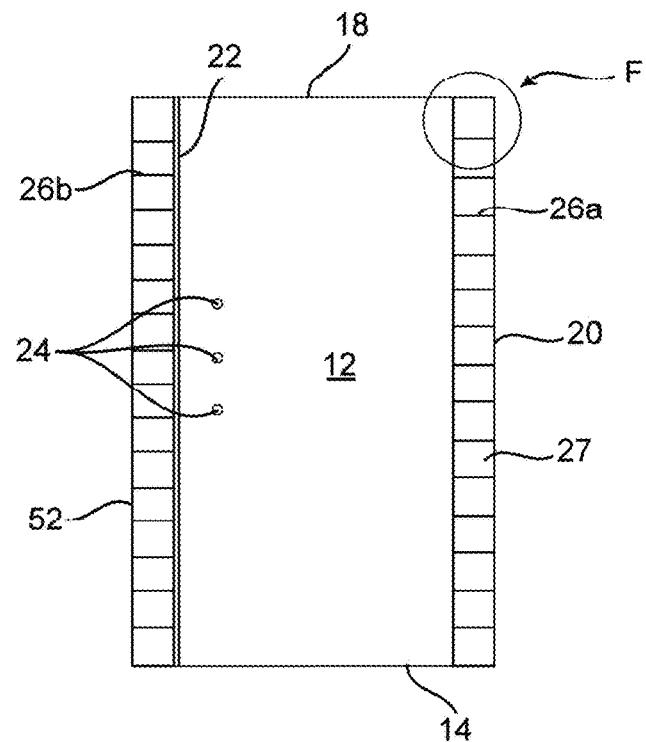
FIG. 7 is a sectional view of D-D, shown in FIG. 3, of the apparatus of FIG. 1 in an engaged state.

Referring to FIGS. 1-3, the lid 50 includes a top section 52 having an indented portion 54 with opposing holes 56 for pivotally hold a handle 58. The top section 52 includes a pair of apertures 24, each measuring 2 to 3 mm in diameter, but could be as small as 1 mm, the number of apertures and positioning of the same having been determined to be optimal based on results from experiments conducted by the inventor of the present application.

Figure 8:
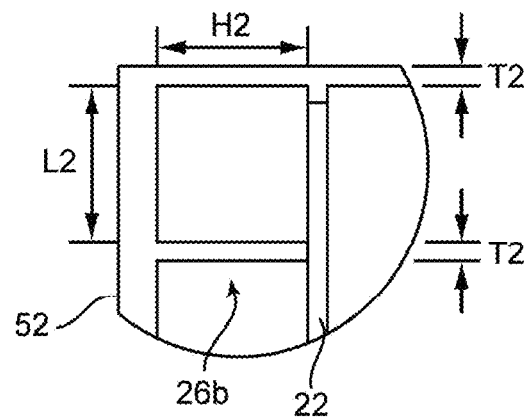
FIG. 8 is sectional view of E, shown in FIG. 6.

Referring to FIGS. 1, 2, 6 and 8, the lid 50 includes a bottom section 60. The bottom section 60 includes second ribs 26b extending therefrom. In this embodiment, each rib 26b is about 1.5 mm in thickness T2 and symmetrical in each direction, approximately 12.7 mm, i.e., length L2, width W2, and height H2, as shown in FIG. 8. A free portion 62 extends along a perimeter of the bottom section 60 between the ribs 62 and free ends of the bottom section 60. The width of the free portion 62 is substantially equal to or slightly greater than the thickness of the chamber upper portion 12a, 14a, 16a, 18a.

As shown in FIGS. 4-8, the lid 50 is configured to form an enclosure when engaged with the chamber 10. When engaged, the lid free portion 62 engages a top edge of the chamber upper portion 12a, 14a, 16a, 18a, while the lid ribs 26b engage the chamber engagement area 22. In this fashion, the apparatus 100 is fully enclosed.

In the alternative, the lid 50 could be configured to be pivotally coupled to the chamber 10. That is, the apparatus 100 could be provided with a hinge such that a side edge of the lid 50 could be coupled with a corresponding upper edge of the chamber 10. In this configuration, the lid 50 could be open and closed while attached to the chamber 10 at all times.

The chamber 10, lid 50 and parts thereof described above are constructed by injection molding with rigid plastic. Thus, the apparatus 100 is easily cleaned with common cleaning agents and methods, such as soap and water. However, other materials could be used, for example, metal and metal alloys. Moreover, the ribs 26a, 26b could be provided with a soft reinforcement such as foam, rubber or soft plastic to protect produce stored within the apparatus from bruising or deformation.

In this embodiment, tests conducted by the inventor of the present invention have shown that a non-treated unripe avocado will ripen within 3 days when stored in the apparatus 100 compared with 5-7 days when stored in open space.

Second Embodiment

Referring to FIGS. 10-15, a second embodiment of an apparatus 200 of the present invention is shown. In general, the apparatus 200 includes a chamber 110 and a removable lid 150.

Figure 10:
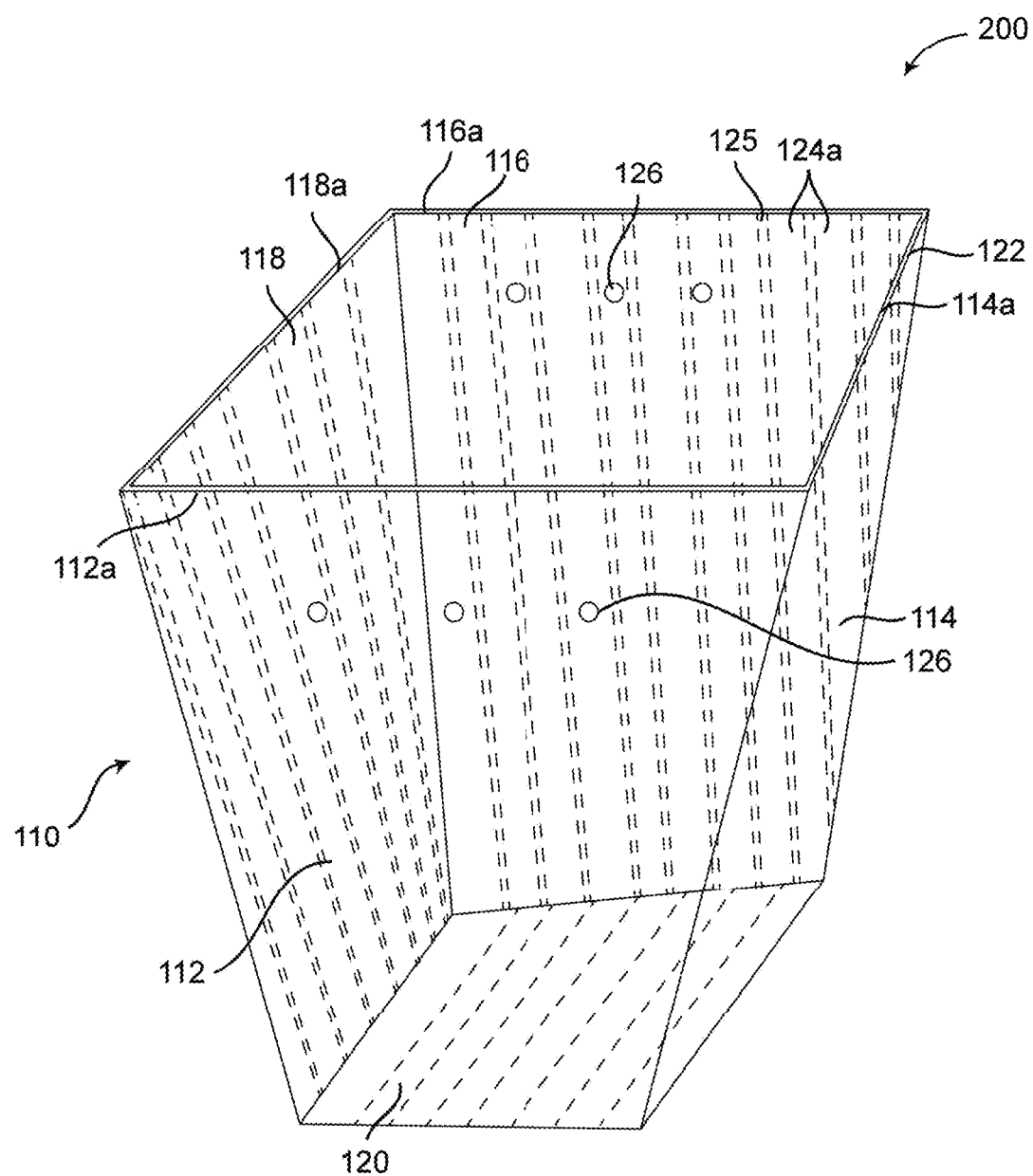
FIG. 10 is a perspective view of a container or chamber portion of a second embodiment of an apparatus of the present invention.
Figure 11:
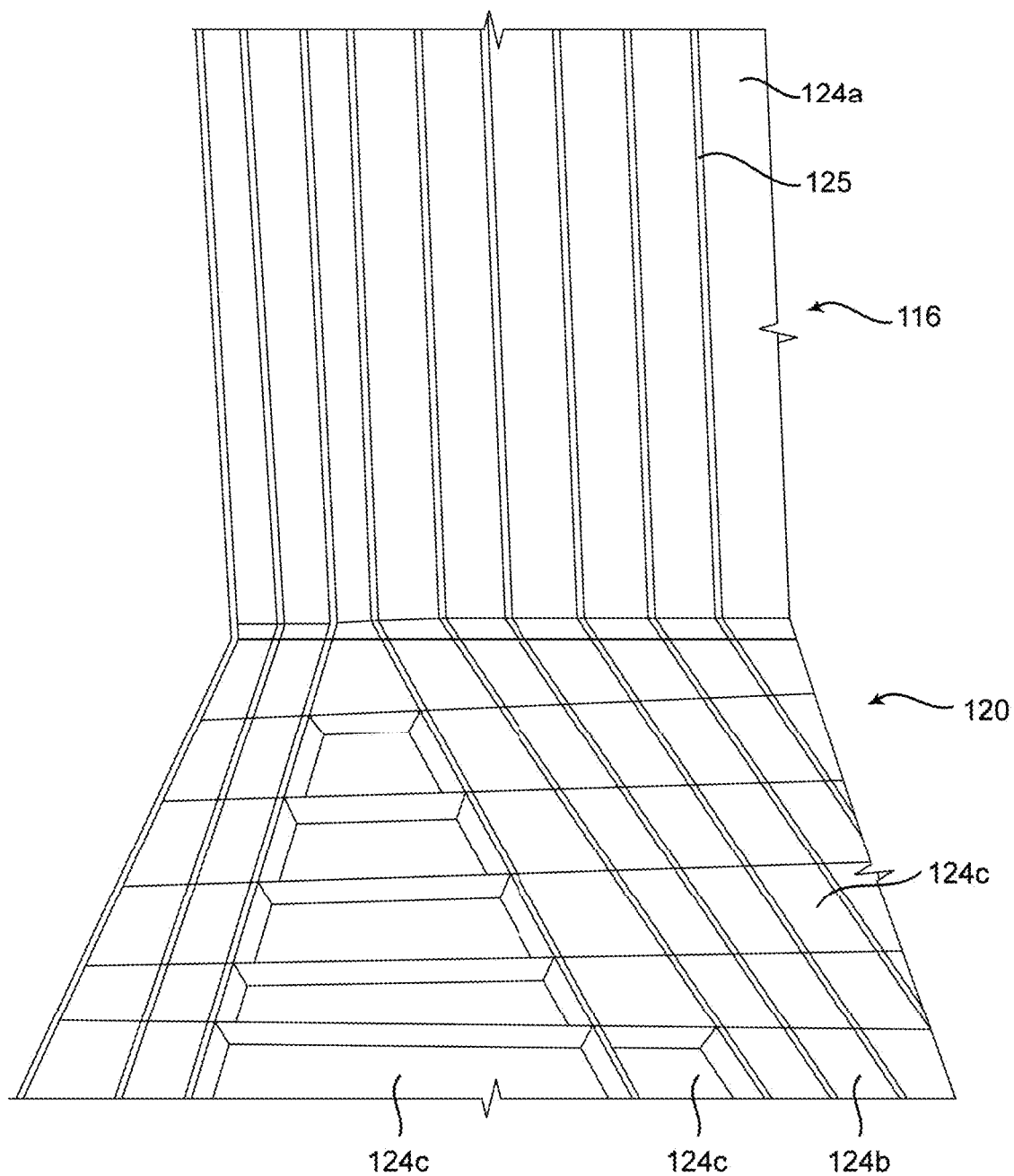
FIG. 11 is a partial perspective view of an inner portion of the container of FIG. 10.
Figure 12:
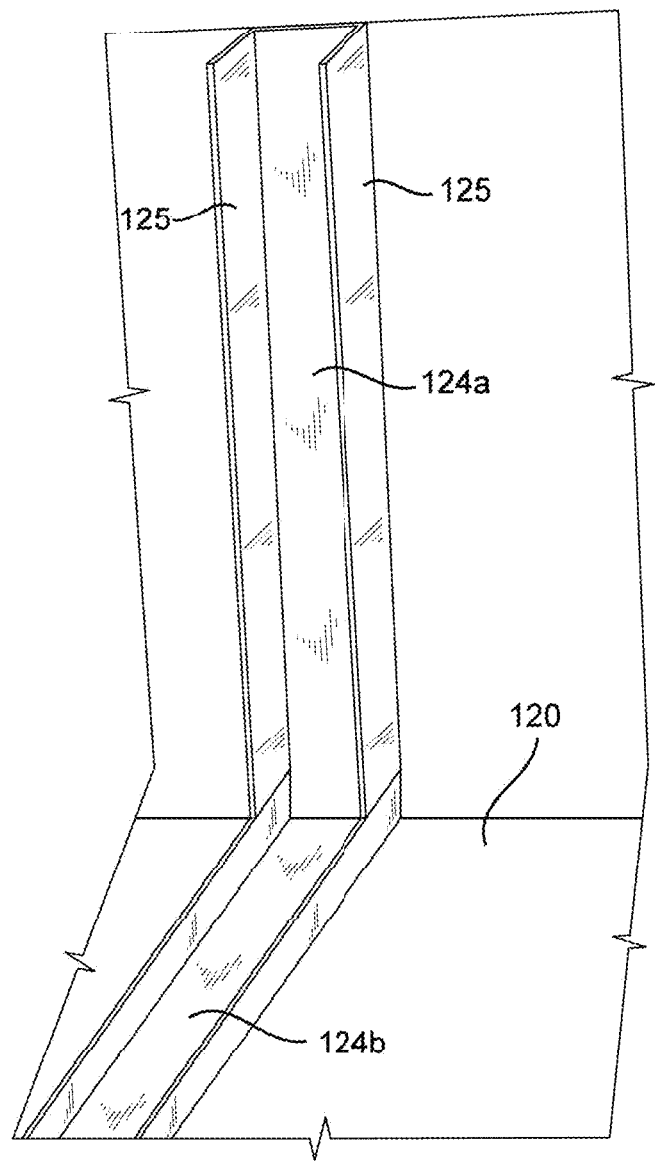
FIG. 12 is a partial perspective view of a groove of the inner portion of the container of FIG. 10.

Referring to FIGS. 10-12, the chamber 110 includes a plurality of walls 112, 114, 116, 118 and a floor 120 coupled together to form a partial integral enclosure with an open top. In this embodiment, there are four walls but more or less walls could be included. The floor 120 is substantially square in shape having approximate dimensions of 8.5 in on each side. Each wall 112, 114, 116, 118 extends upwardly at an angle such that a substantially square upper perimeter 122 is formed along an upper edge of the chamber 110, having approximate dimensions of 9 in on each side. Moreover, the thickness of each wall is approximately 1/16 in.

Referring again to FIGS. 10-12, inner surfaces of each wall 112, 114, 116, 118 are provided with a plurality of wall grooves 124a, formed by flanges 125 extending from the walls 112, 114, 116, 118, and extending the length of the walls 112, 114, 116, 118 as shown for example in FIG. 12. In this embodiment, each groove 124a is 0.5 in in width and depth. Similarly, an upper surface of the floor 120 is provided with a plurality of floor grooves 124b corresponding to and interconnected with the wall grooves 124a of each wall 112, 114, 116, 118, thus forming grids 124c as shown for example in FIG. 11. In this embodiment, the minimum dimensions of each grid 124c is 0.5 in in length, width and depth. Thus, grids of various dimensions could be formed on the floor 120 as shown in FIG. 11.

The dimensions and orientation of the grooves 124a, 124b and grids 124c could be varied depending on the application. Because the walls 112, 114, 116, 118 extend upwardly at an angle from the floor 120, the wall grooves 124a could extend from the floor 120 perpendicular to the floor grooves 124b or at an angle and parallel to the intersection lines of adjacent walls.

Referring to FIG. 10, two opposing walls 112, 116 are provided with apertures 126. Here, three spaced apart apertures 126 are positioned on a top section of each wall 112, 116, each measuring 2 to 3 mm in diameter. Alternatively, so long as the positioning of the apertures remains at a top portion of the walls, the number of apertures and location from one wall to another could be adjusted as long as the total area of openings remains the same or substantially the same. For example, each wall 112, 114, 116, 118 could include a single aperture having a diameter of 3 to 4.5 mm.

Figure 13:
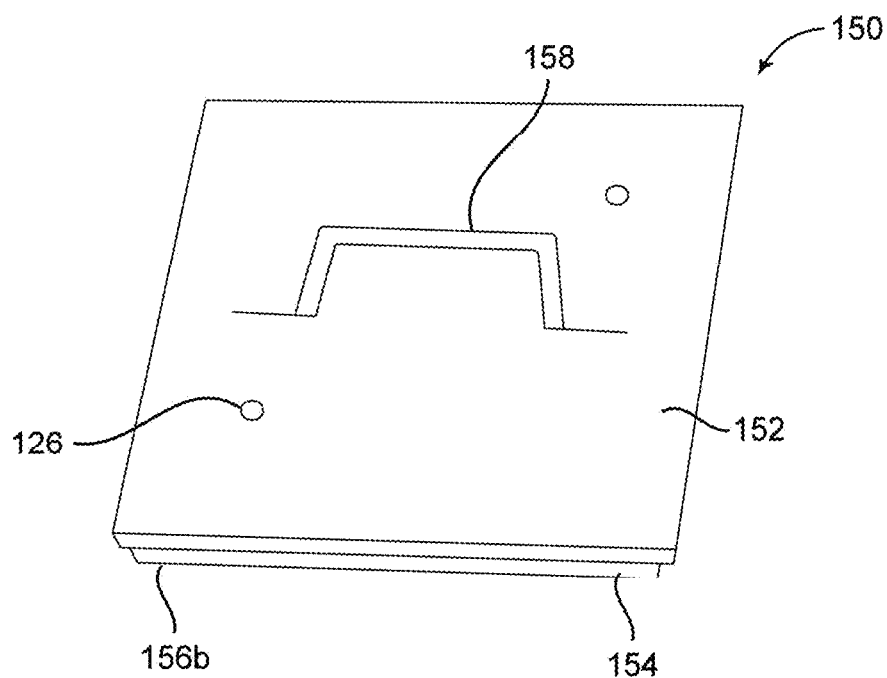
FIG. 13 is a top perspective view of a lid of a second embodiment of an apparatus of the present invention.
Figure 14:
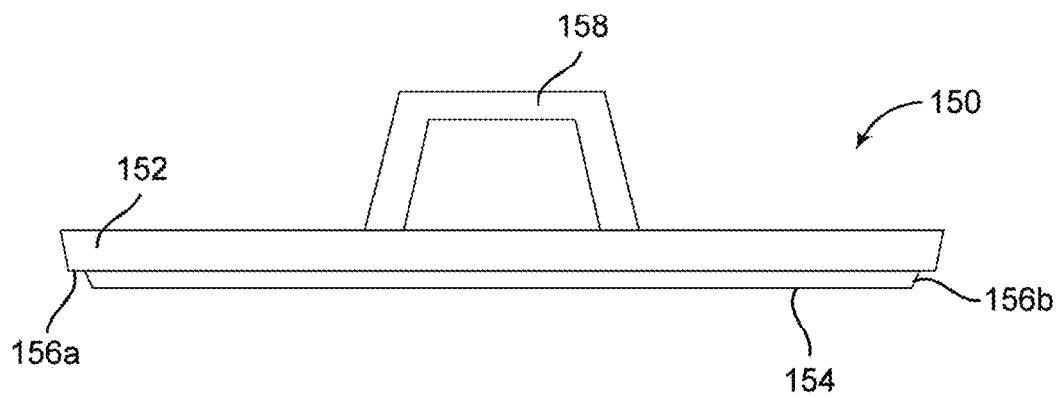
FIG. 14 is a side plan view of the lid of FIG. 13.
Figure 15:
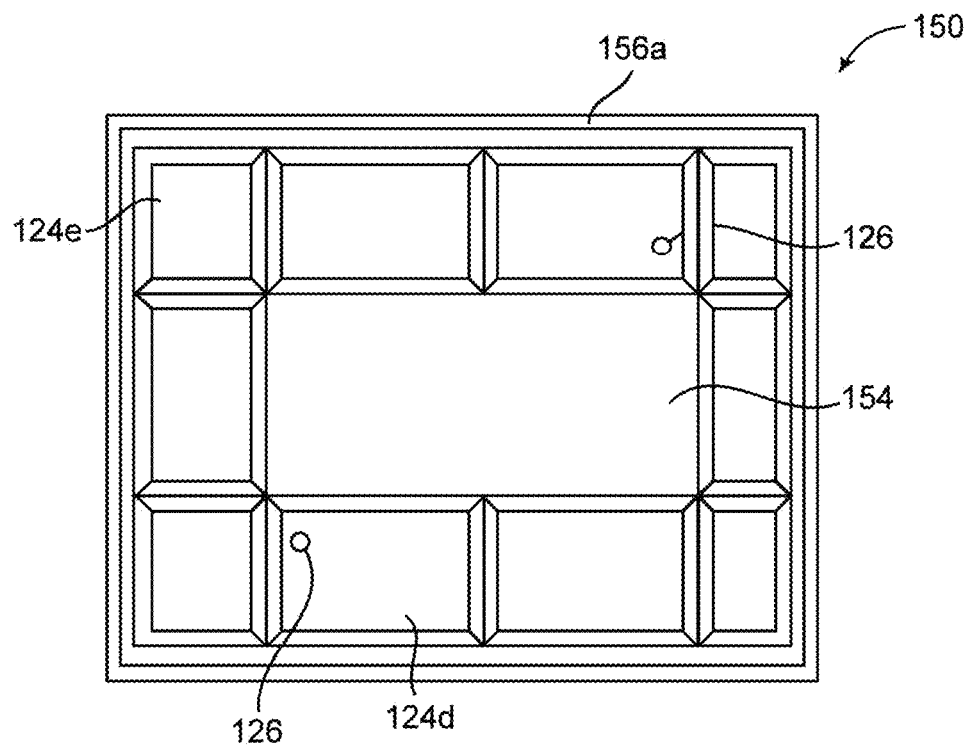
FIG. 15 is a bottom plan view of the lid of FIG. 13.

Referring to FIGS. 13-15, the lid 150 includes a substantially flat top section 152 having a handle 158 pivotally coupled thereto. The lid 150 includes a pair of apertures 126 extending therethrough, each measuring 2 to 3 mm in diameter, but could be as small as 1 mm, the number of apertures and positioning of the same having been determined to be optimal based on results from experiments conducted by the inventor of the present application. A bottom section 154 is offset inward at an angle from a perimeter of the top section 152 forming an upper engagement surface 156a and a side engagement surface 156b, as shown in FIGS. 14 and 15. The bottom section 154 also includes a plurality of grids formed by a plurality of intersecting grooves. Here, the grids could vary in size, for example, some grids 124d having a width and depth of 0.5 in and length of 1 in, while some grids 124e at 0.5 in in length, width and depth.

The lid 150 is configured to form an enclosure when engaged with the chamber 110. When engaged, the upper engagement surface 156a engages a top edge of the walls 112a, 114a, 116a, 118a, while the side engagement surface 156b engages the flanges 125 of the wall grids 124a. In this fashion, the apparatus 200 is fully enclosed.

In the alternative, the lid 150 could be configured to be pivotally coupled to the chamber 110. That is, the lid 150 could be provided with a hinge such that the lid 150 could be coupled with a corresponding wall 112, 114, 116, 118. In this configuration, the lid 150 could be opened and closed while attached to the chamber 110 at all times.

The chamber 110, lid 150 and parts thereof described above are constructed by injection molding with rigid plastic. Thus, the apparatus 200 is easily cleaned with common cleaning agents and methods, such as soap and water. However, other materials could be used, for example, metal and metal alloys. Moreover, the grooves 124a, 124b and grids 124c could be provided a soft reinforcement such as foam, rubber or soft plastic to protect produce stored within the apparatus from bruising or deformation.

In this embodiment, tests conducted by the inventor of the present invention have shown that a non-treated unripe avocado will ripen within 3 days when stored in the apparatus 200 compared with 5-7 days when stored in open space.

Third Embodiment

In a third embodiment of the present invention, either apparatus of the first and second embodiments described above are utilized with a few differences. Apertures on the walls of the chamber are eliminated and only the lid includes a pair of apertures to promote air flow. Here, the number of apertures and positioning of the same having been determined to be optimal based on results from experiments conducted by the inventor of the present application.

Figure 16:
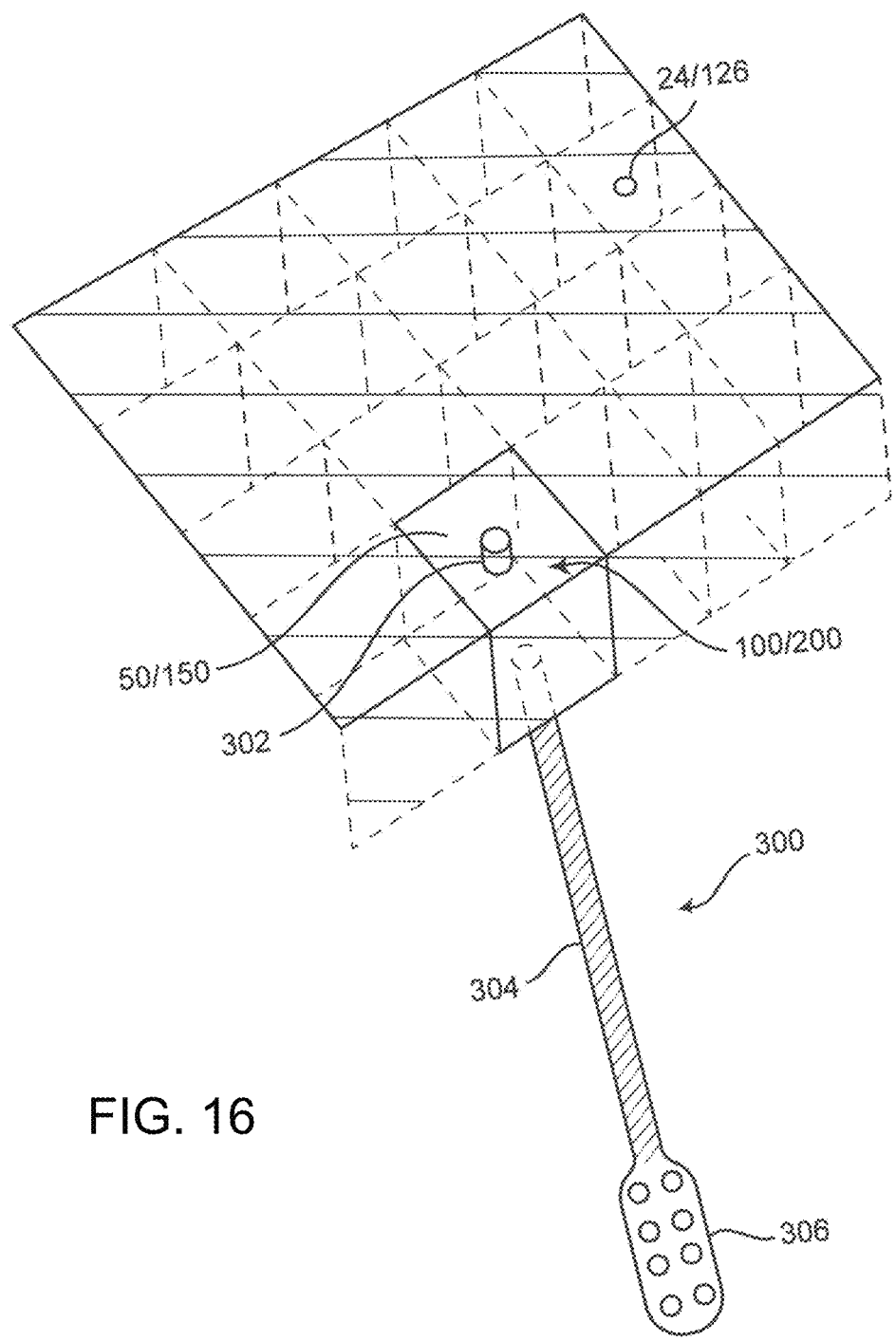
FIG. 16 is a partial perspective view of a flow cell of the present invention

Referring to FIG. 16, a flow cell 300 is included with the apparatus 100, 200. A hole 302 extends through the lid 50, 150 from which a straw 304 extends downwardly therefrom. A lower end of the straw 304 includes an optional collecting bulb 306 having additional holes such that air within the apparatus is exposed to the atmosphere through the aforementioned components. In this embodiment, the straw 304 has a length sufficient for the collecting bulb 306 to rest near the floor 20, 120 of the apparatus 100, 200. Alternatively, the flow cell 300 could be installed on any one of the walls so long as the lower end of the straw is positioned at a lower portion within the apparatus.

The molecular weight of ethylene is 28.05 g/mol while carbon dioxide is 44.01 g/mol and methane is 16.04 g/mol. It is known that too much ethylene will result in rapid ripening and/or uneven ripening. For example, if a banana is stored within a completely enclosed container the banana will ripen very fast and unevenly. This is due to excessive ethylene in combination with methane.

In the first and second embodiments, the apertures are positioned at upper portions of the apparatus 100, 200 to provide the proper chemical balance in the air within the chamber. Thus, by positioning the apertures at upper sections of the apparatus 100, 200 a sufficient amount of ethylene is maintained while sufficient amounts of carbon-dioxide and methane are discharged from the chamber.

In the third embodiment, however, the ripening process is further excelled by use of the flow cell 300. Tests conducted by the present inventor have shown that most carbon dioxide is produced during the first 24 hours of the ripening process but drops dramatically after 24 hours, and conversely, a very low amount of ethylene is produced during the first 24 hours of the ripening process and higher amounts are produced after the first 24 hours. Given that the molecular weight of carbon dioxide is higher than ethylene, as described above, the flow cell 300 is engaged during the first 24 hours so that carbon dioxide within the apparatus 100, 200 is dissipated from a lower portion of the apparatus 100, 200 to the atmosphere through the flow cell 300 by principles of Fick's Law. After the first 24 hour period when less carbon dioxide is produced and more ethylene is produced, the hole 302 is plugged and the flow cell 300 is disengaged.

In this fashion, the ripening process is further accelerated by maintaining optimal levels of ethylene within the chamber while discharging other gases through the apertures 24, 126 on the lid 50, 150. Tests conducted by the inventor here has shown that a firm, untreated, organic avocado is ripened within 48 hours in the apparatus of the third embodiment with use of the flow cell 300.

The apparatus of the present invention described as the first, second and third embodiments are part of a system for evenly ripening produce in a short period of time. Specifically, the present system provides a means to expose produce within the apparatus to the right amount of the natural chemicals produced therefrom to cause a substantial respiratory rise sufficient to trigger climacteric or softening of the produce stored therein and continue to consistently ripen within a short period of time.

The enclosed apparatus provides a sufficiently humid environment while expelling carbon dioxide and methane, and promoting ethylene storage. The ribs and grooves described above provide a means for air within the apparatus 100, 200, in particular ethylene within the air, to make maximum contact with the surface of the produce stored therein.

The system and apparatus of the present invention have been tested with organic avocados, that is, avocados which have not been treated with foreign ethylene. These avocados have been tested for ripeness using the system of the present invention and compared with ripening in ambient air. As mentioned above, the ripening process is reduced from 5-7 days to 2-3 days by utilizing the present system and apparatus.

Fourth Embodiment

In a fourth embodiment of the present invention, shown in FIGS. 17-20, an apparatus 400 includes a chamber 410 and a lid 450 removably mounted to the top of the chamber 410. With the lid 450 mounted on the chamber 410, the overall apparatus 400 may be dimensioned to be 6 in×6 in×6 in, to have the same or substantially the same size and dimensions as the apparatuses 100, 200 in the embodiments described above. The apparatus 400 is a fruits, vegetables, and produce fresh keeper box for accommodating and ripening any type of fruit, vegetable and/or produce.

Figure 17:
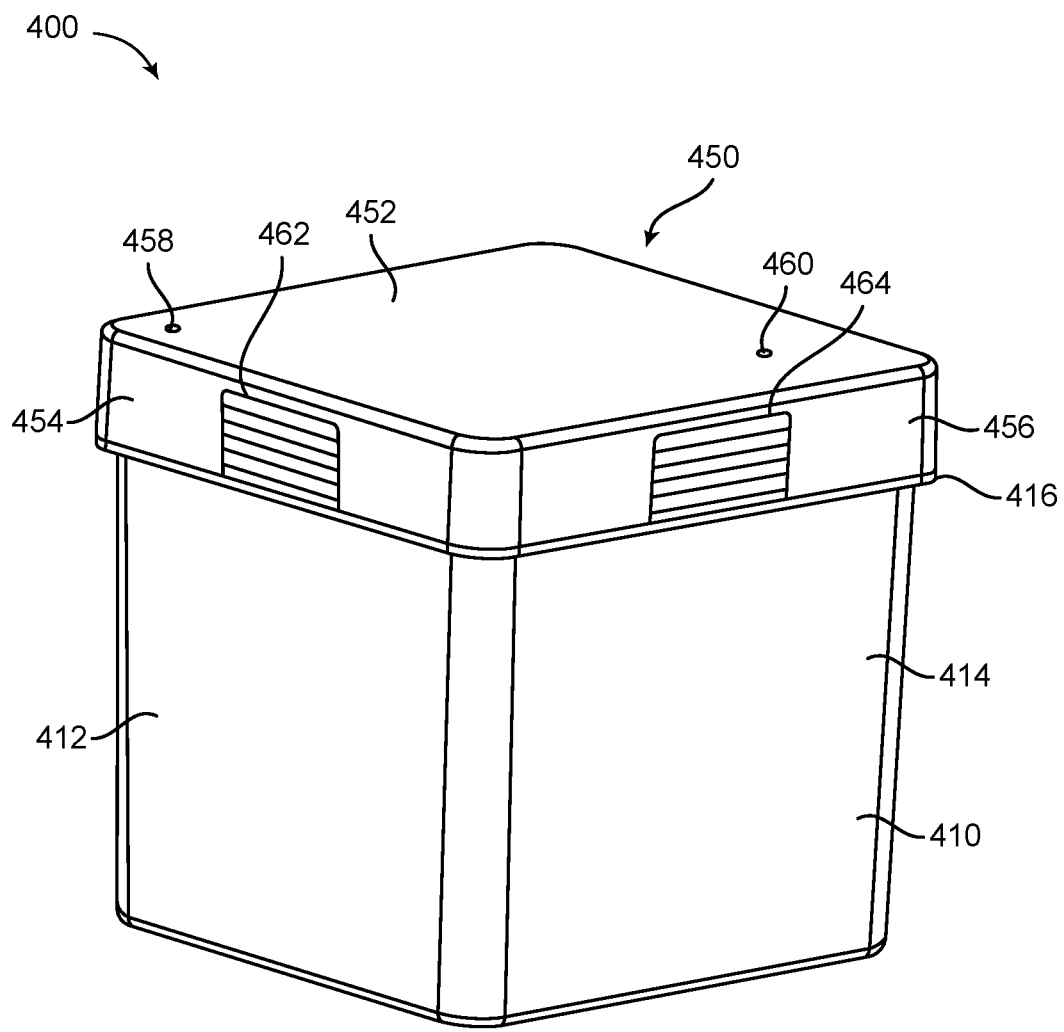
FIG. 17 is a top side perspective view of a fourth embodiment of an apparatus of the present invention.

As shown in FIG. 17, the chamber 410 has a plurality of walls 412, 414 which lack apertures. The lid 450 has a top surface 452 and side walls 454, 456, which may be dimensioned to be 6 in×6 in×1 in. A lip 416 is formed on the walls 412, 414 which complement the side walls 454, 456, respectively, and form a sealed configuration when the lid 450 is removably mounted on the top of the chamber 410. The top surface 452 has apertures 458, 460 extending therethrough which will be described in greater detail below. The side walls 454, 456 have grooves 462, 464, respectively, on the exterior surface of the side walls 454, 456, allowing a user to grip and pull off the lid 450 from the chamber 410.

Figure 18:
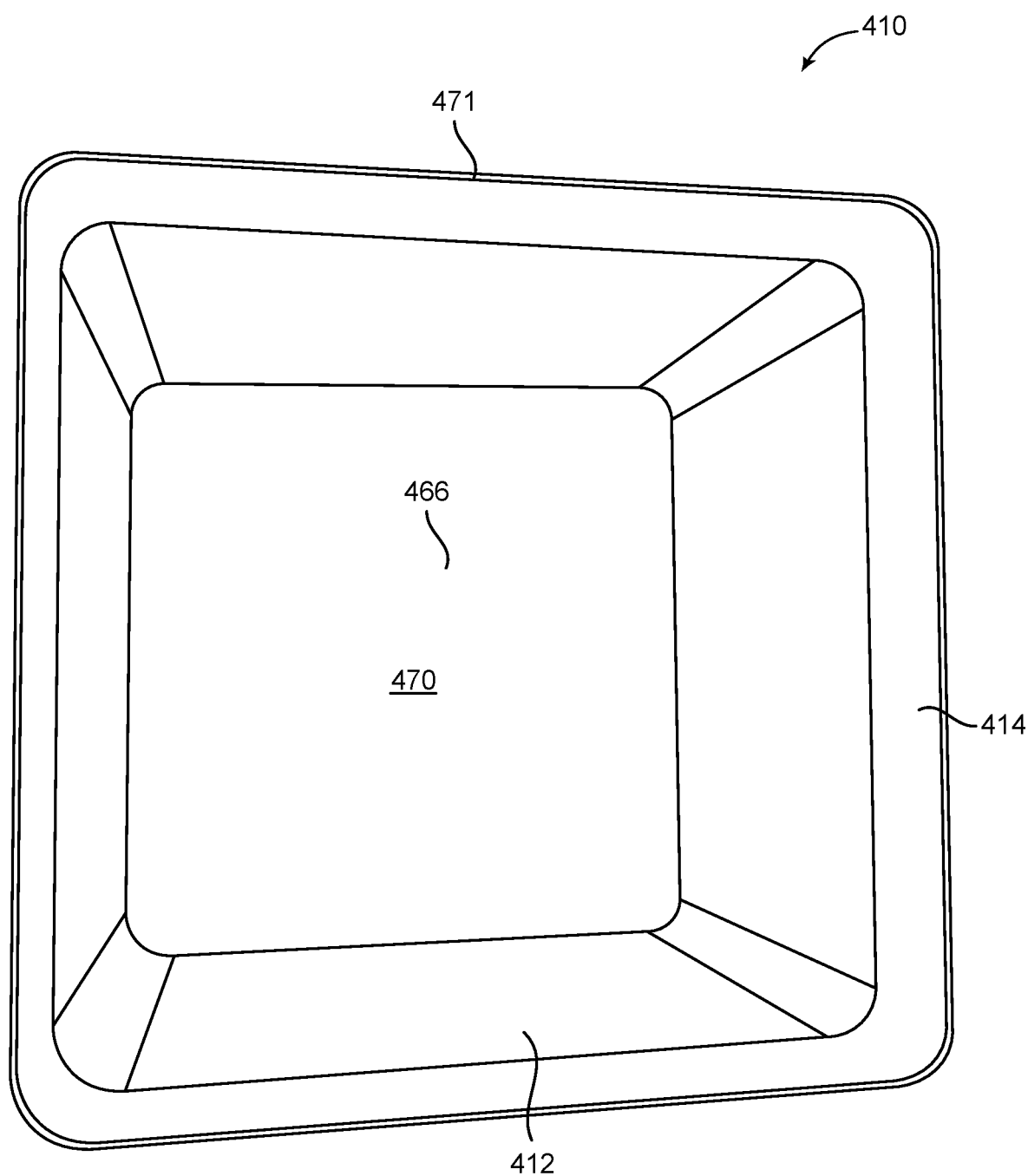
FIG. 18 is a top plan view of a chamber of the apparatus of FIG. 17.

FIG. 18 is a top plan view of the chamber 410 of FIG. 17 having the walls 412, 414 and a bottom surface 466 forming an interior 470 therebetween. The top 471 of the walls 412, 414 form an edge to removably engage the underside of the lid 450, as described below. The interior surfaces of the walls 412, 414 and the bottom surface 466 are substantially smooth and lack internally disposed structures, which maximizes the volume within the chamber 410 for storing produce.

Figure 19:
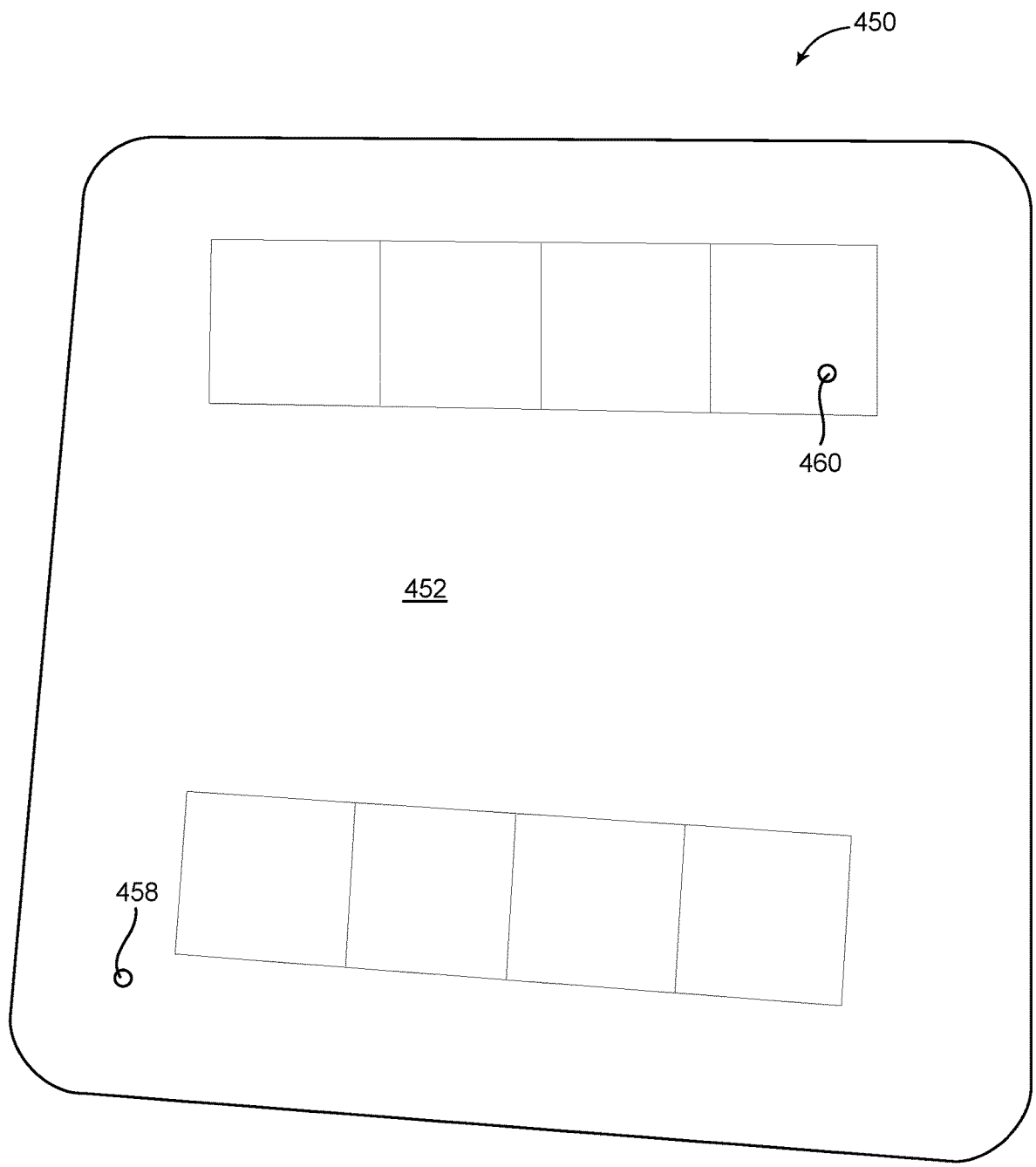
FIG. 19 is a top plan view of a lid of the apparatus of FIG. 17.

FIG. 19 is a top plan view of the lid 450 with apertures 458, 460 extending through the top surface 452. In a preferred embodiment, the apertures 458, 460 have a diameter of 2 mm to 3 mm, and alternatively such apertures measure 0.5 mm to 3 mm in diameter. As described below, the apertures 458, 460 are positioned eccentrically on the lid 450 to promote ripening of produce and fruits stored in the chamber 410 enclosed by the lid 450.

Figure 20:
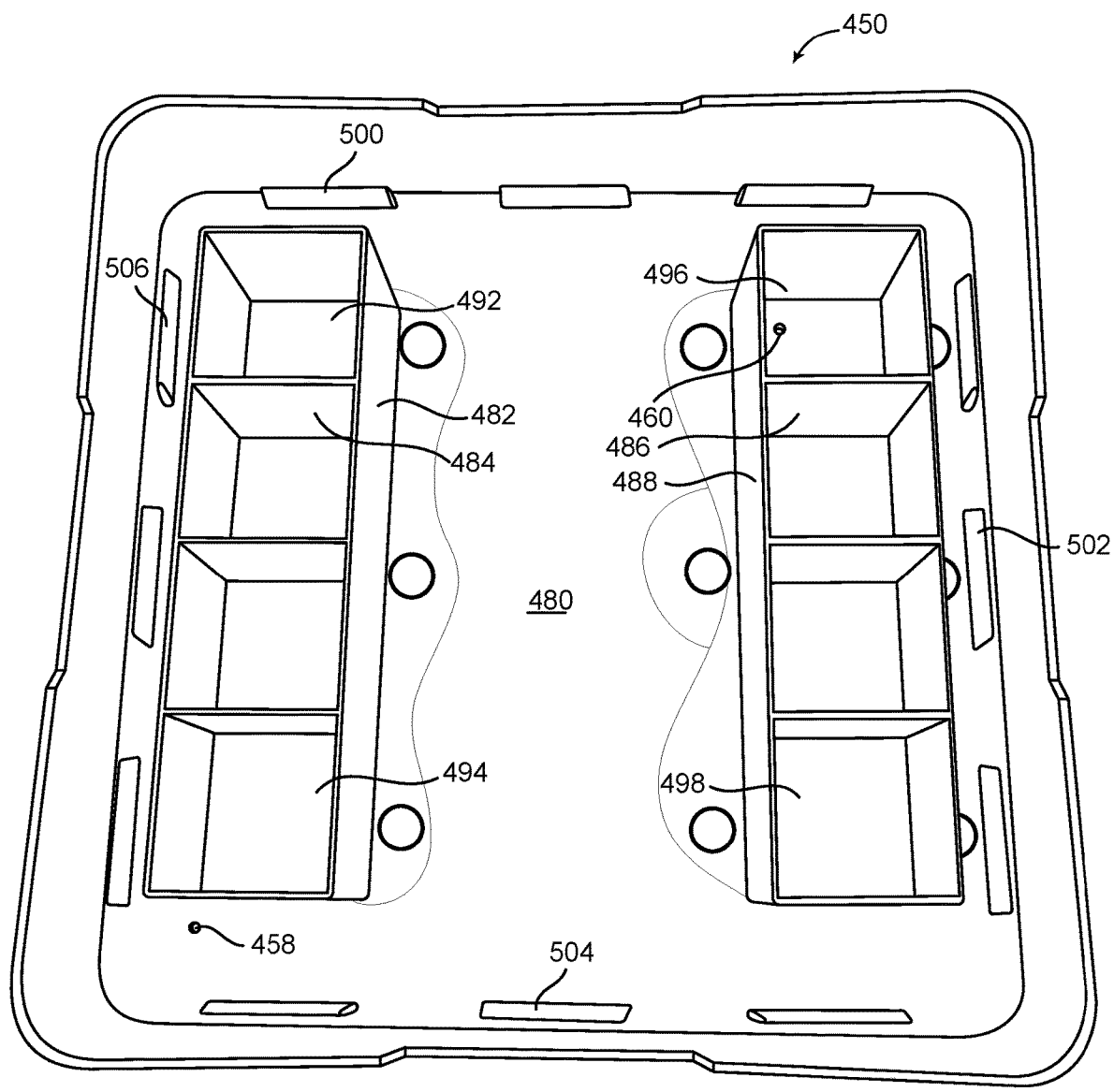
FIG. 20 is a bottom plan view of the lid of FIG. 19.

FIG. 20 is a bottom plan view of the lid 450 of FIG. 19 having an underside surface 480 on an opposing side of the lid 450 relative to the top surface 452, and with the apertures 458, 460 extending therethrough. A plurality of cavity walls 482, 484, 486, 488 extend downward from the underside surface 480 and form a plurality of cavities 492, 494, 496, 498. The dimensions of each of the cavities 492, 494, 496, 498 may be 1 in×1 in×1 in. Such dimensions of the cavities 492, 494, 496, 498 are larger and taller in the fourth embodiment than in other embodiments, which make the cavities 492, 494, 496, 498 operate in such a way that flanges in other embodiments are not required at the bottom of the chamber 410, and only a few flanges or walls 482, 484, 486, 488 are needed on the underside surface 480 of the lid. Such larger cavities 492, 494, 496, 498 retain more ethylene and/or the ripening hormone in close proximity to any fruits and vegetables from within the cavities 492, 494, 498 which lack such apertures as in the case with the aperture 460 in the cavity 496.

Similarly, the relatively taller columns formed by the walls of the cavity 496 evacuate more carbon dioxide from the chamber 410 through the eccentrically positioned aperture 460 in the cavity 496. Such configurations of walls 482, 484, 486, 488, of cavities 492, 494, 496, 498, and apertures 458, 460, with the aperture 458 outside any cavity 482, 494, 496, 498, and with the aperture 460 inside one cavity 496 makes the apparatus 400 more efficient and ripens fruits and vegetables faster than structures in the prior art.

The cavity walls 482, 484, 486, 488 may be configured to form two rows or flanges of at least cavities 492, 494, 496, 498, with a first row having at least the cavities 492, 494, and a second row having at least the cavities 496, 496. The rows or flanges of at least the cavities 492, 494, 496, 498 are set about 2.6 in apart to form an intermediate region to accommodate additional fruits or vegetables within the apparatus 400. In addition, such rows or flanges of at least the cavities 492, 494, 498, which lack apertures, are configured to retain favorable gases such as ethylene, ripening hormones, and any oils elevated to the underside surface 480 of the lid 410 by relatively strong gas pressures from water and carbon dioxide gases during the first twenty-four hours of storage of fruits and vegetables in the apparatus 400. Such cavities 492, 494, 498 lacking apertures function as collecting ducts, while such cavities 496 having an aperture 460 functions as evacuation ducts.

As described below, the aperture 458 is positioned to be outside of any of the cavities 492, 494, 496, 498, while the aperture 460 is positioned to be within one of the cavities 492, 494, 496, 498. In a preferred embodiment, the aperture 460 is disposed within the cavity 496. The apertures 458, 460 are positioned diagonally opposite, with the aperture 460 within the cavity 496 to promote ripening. By having at least one aperture 460 positioned eccentrically in the cavity 496, this permits accumulation of carbon dioxide inside the cavity 496, which in turn allows for rapid evacuation of the carbon dioxide into the atmosphere because the partial pressure of the carbon dioxide inside the cavity 496 will be greater than the atmospheric pressure of carbon dioxide. Such differences in pressures of carbon dioxide allows for rapid evacuation of the carbon dioxide gas while retaining the ripening molecule; that is, ethylene due to the difference in emission rates between carbon dioxide and ethylene. In addition, if the aperture 460 is positioned central to the cavity 496, all gases including ripening gases and moisture released during the ripening process are eliminated at the same rate and results in preservation of fruits and vegetables. Such positioning and use of apertures and cavities for ripening and/or preservation of fruits and vegetables and other produce utilize the laws of diffusion and form the Obolo Principle of gas exchange, discovered and invented by the present inventor.

The position of the aperture 460 within the cavity 496 controls the rate of evacuation of gases from the apparatus 400, in that the position of the aperture 460 may increase or decreases such rates of evacuation. For example, since the aperture 460 is not in the center of the cavity 496, but instead is eccentrically positioned near a corner of the cavity 496, the predominant gas such as carbon dioxide is allowed to build up in the cavity 496. The pressure from the built-up predominant gas surpasses the pressure of the predominant gas in the atmosphere, and so allows for rapid evacuation of the predominant gas from the apparatus 400 within the first twenty-four hours of packing the fruits and vegetables therein.

However, any generated ethylene is not easily evaporated from the apparatus 400 since it is heavier than the predominant gas, such as carbon dioxide. Therefore, the generated ethylene builds up and forms an oil, typically located within the cavities 492, 494, 496, 498 as well as the underside surface 480 of the lid 410. These oils could be collected for use in other applications for germination stimulation, e.g., human hair growth and plant seed germination. After the predominant gas such as carbon dioxide is eliminated from the apparatus 400, the apparatus 400 is filled with a mixture of ethylene oil and water vapor for final ripening and preservation.

All cavities 492, 494, 498 without apertures retain some moisture as well as keeping the fruits, vegetables, and other produce most. In alternative embodiments, multiple apertures may be disposed in the lid 450 within two or more of the cavities 492, 494, 496, 498 to promote fruit preservation by expelling all ripening molecules and/or hormones, and in combination with the aperture 458 to preserve fruits and vegetables while the apparatus 400 is in transit. For example, in one alternative embodiment, the rows of at least the cavities 492, 494, 496, 498 have apertures such as the aperture 460 through the lid 410, with one aperture in each of the at least cavities 492, 494, 496, 498, and such apertures being centrally located in a respective cavity 492, 494, 496, 498.

With such apertures centrally located in cavities, the apparatus 400 functions to preserve fruits, vegetables and/or other produce, such as avocados, by doubling their shelf life, particularly in refrigeration. For example, a ripe whole avocado in the apparatus 400 can be preserved for up to six weeks in refrigeration without spoiling. In addition, a ripe half avocado in the apparatus 400 can be preserved for up to seven days in refrigeration without spoiling. Shelf lives for fruit, vegetables, and produce, such as avocados, in the apparatus 400 are also extended at room temperature for one week.

Cavities 492, 494, 496, 498 with centrally located apertures may be arranged in rows, as shown in FIG. 20, or such cavities 492, 494, 496, 498 may be scattered underneath the lid 410 with central apertures on the top of the lid 410 and passing therethrough. As described herein, some cavities may have apertures therein, such as cavity 496 in FIG. 20, while other cavities may not have apertures at all, such as cavities 492, 494, 498 shown in FIG. 20.

In conjunction with the aperture 458 not positioned in any of the cavities 492, 494, 496, 498, most gases and ripening hormones are evacuated from the apparatus 400. This evacuation action reverses the actions of the ripening fruits, vegetables, and produce, and in doing so, preserves such fruits, vegetables, and produce longer. An apparatus 400 with such additional apertures is designed and configured to preserve foods for longer times in refrigerators.

In addition, any aperture in the lid 410 may be extended externally by a relatively small tube, as described in conjunction with FIG. 16, to increase gas evacuation from the apparatus 400 and to preserve food therein. The small external tube further increases the partial pressure of gas mixtures, and permits easier gas evacuation.

Referring to FIG. 20, the underside surface 480 of the lid 450 also has guarding and sealing rails 500, 502, 504, 506 positioned around the periphery of the lid 450. The rails 500, 502, 504, 506 mate with and removably engage the tops 471 of the walls 412, 414 of the chamber 410, as shown in FIG. 18 to anchor the lid 450 in a firm but releasable seal, in conjunction with the lip 416, where the lid 450 meets the underside surface 480.

Fifth Embodiment

Figure 21:
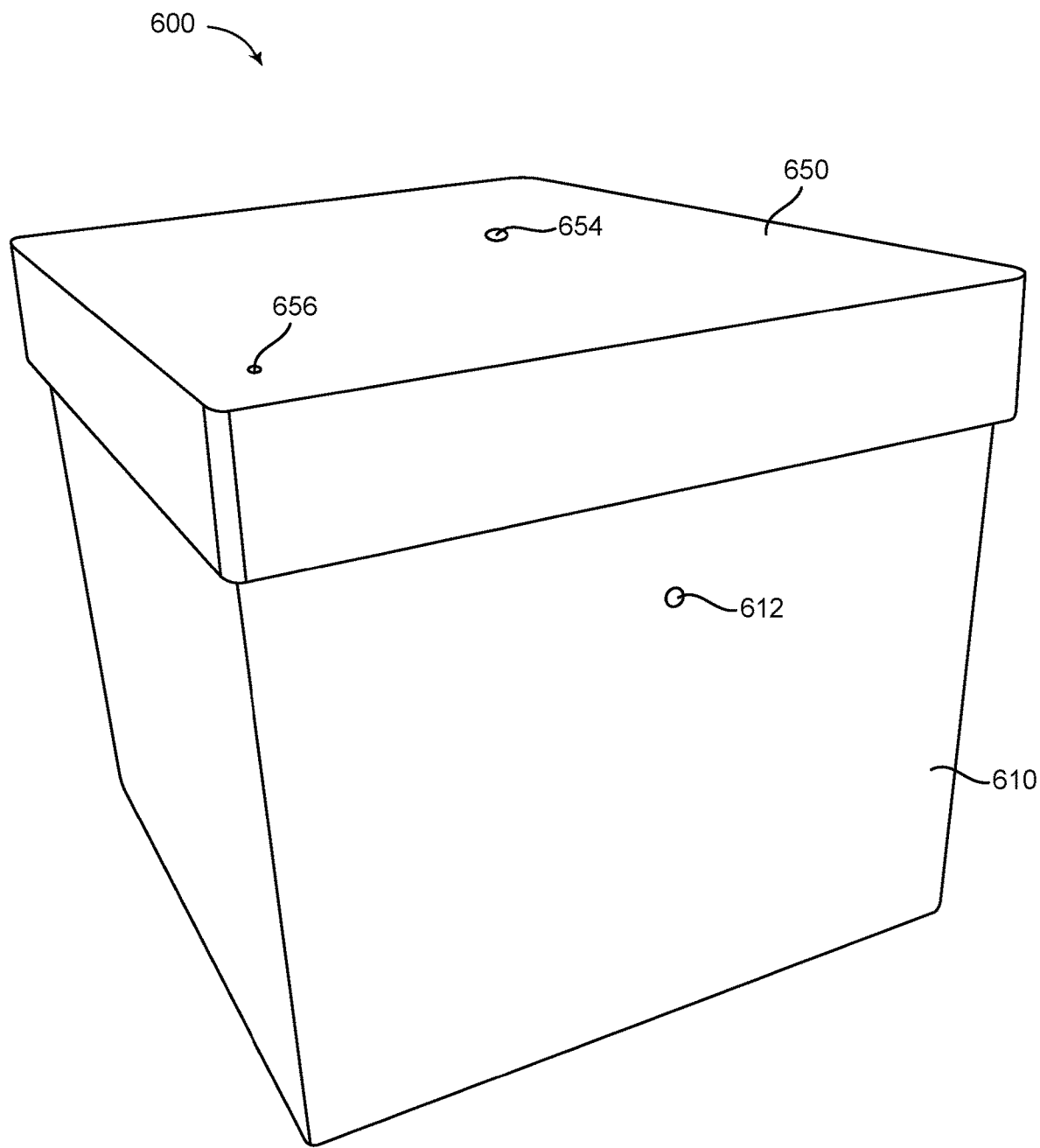
FIG. 21 is a top side perspective view of a fifth embodiment of an apparatus of the present invention.
Figure 22:
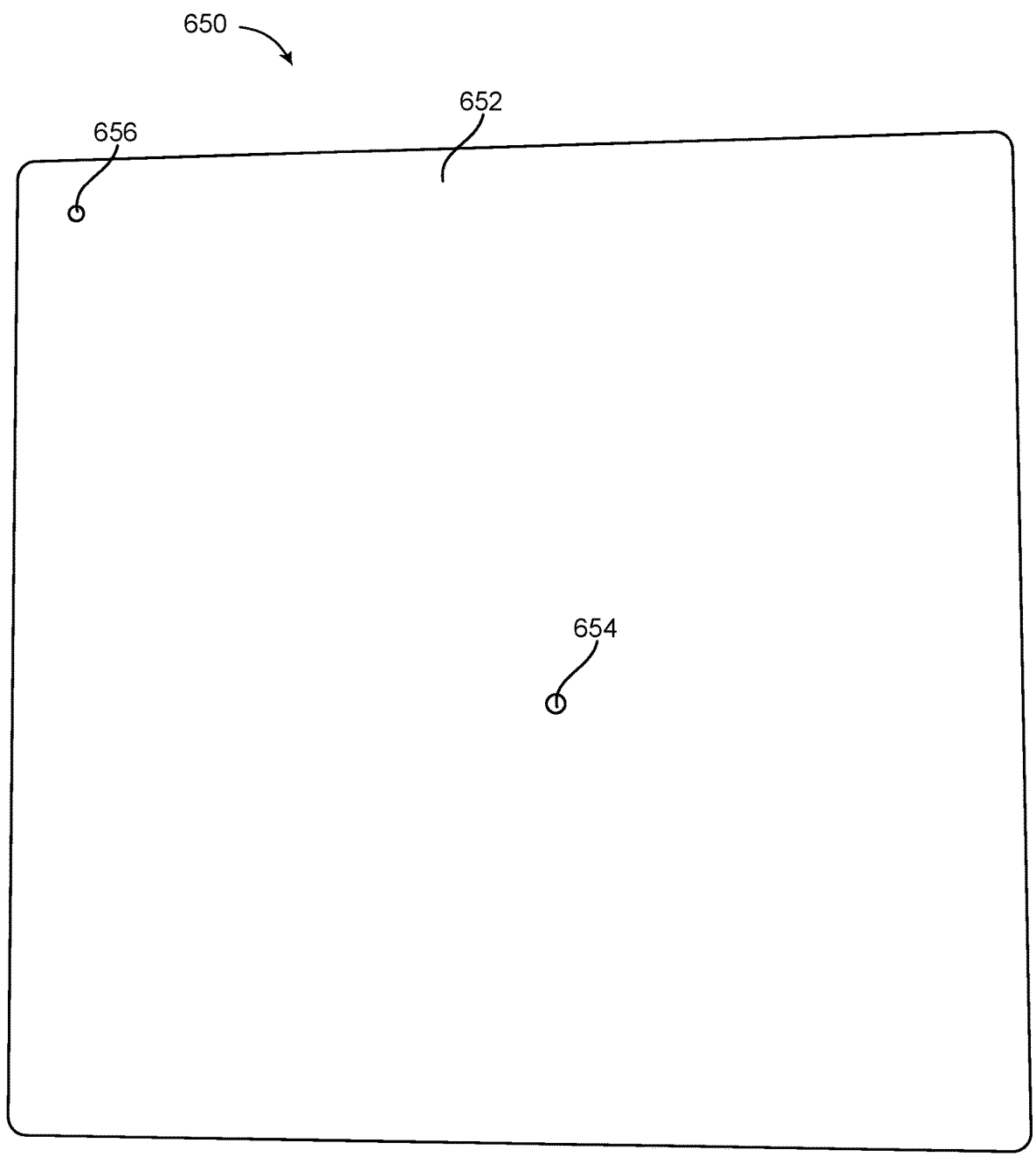
FIG. 22 is a top plan view of a lid of the apparatus of FIG. 21.
Figure 23:
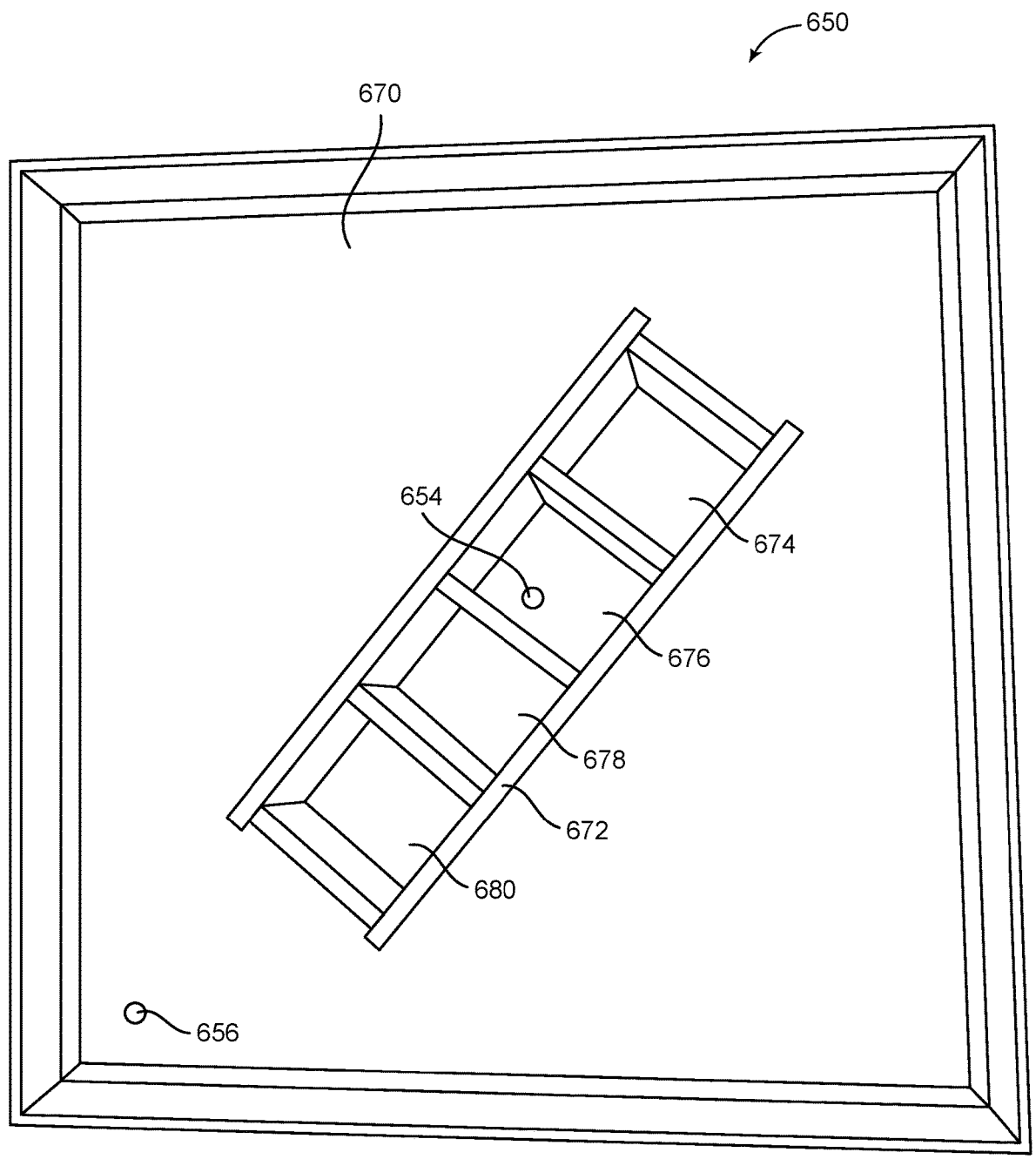
FIG. 23 is a bottom plan view of the lid of FIG. 22.

In a fifth embodiment of the present invention, shown in FIGS. 21-23, an apparatus 600 includes a chamber 610 and a lid 650 removably mounted to the top of the chamber 610. With the lid 650 mounted on the chamber 610, the overall apparatus 600 may be dimensioned to be 6 in×6 in×6 in, to have the same or substantially the same size and dimensions as the apparatuses 100, 200, 400 in the embodiments described above. The apparatus 600 is a fruits, vegetables, and produce fresh keeper box for accommodating and ripening any type of fruit, vegetable and/or produce. The chamber 610 includes an aperture 612 on at least one of the walls of the chamber 610 for evacuating gases and ripening hormones from the apparatus 600 in a manner described above.

FIG. 21 is a top plan view of the lid 650, with a top surface 652 through which the apertures 654, 656 extend for evacuating gases and ripening hormones in a manner described above. The aperture 654 is located substantially in the center of the top surface 652. FIG. 22 is a bottom plan view of the lid 650 of FIG. 21, with a bottom surface 670 having the apertures 654, 656 extending therethrough. A plurality of walls 672 or ribs form cavities 674, 676, 678, 680, in a manner similar to the cavities as described above for collecting oils. These oils could be collected for use in other applications for germination stimulation, e.g., human hair growth and plant seed germination. The walls 672 and cavities 674, 676, 678, 680 may be oriented in any direction on the bottom surface 670. Preferably, one cavity, such as cavity 676, has the centrally-positioned aperture 654 within its walls, such that the walls forming the cavity 676 with the aperture 654 are oriented in a convex manner to function like a funnel for evacuating gases.

The present invention may be embodied in other specific forms without departing from its spirit or essential characteristics. The described embodiments are to be considered in all respects only as illustrative and not restrictive. The scope of the invention will be, therefore, indicated by claims rather than by the foregoing description. All changes which come within the meaning and range of equivalency of the claims are to be embraced within their scope.

The invention claimed is:

1. An apparatus for ripening produce, the apparatus comprising:
   a chamber having a plurality of chamber walls integrally coupled to a floor and forming an interior therein for retaining the produce; and
   a lid configured to be coupled with the chamber at an upper end thereof, the lid having:
      a top having:
         a top surface; and
         an underside surface;
      a plurality of underside walls extending downward from the underside surface and forming a plurality of cavities;
      a first aperture extending through the top surface and the underside surface and positioned within a first cavity of the plurality of cavities; and
      a second aperture extending through the top surface and the underside surface and positioned to not be in any of the plurality of cavities;

wherein a first gas passing through at least the first and second apertures causes the produce to ripen.

2. The apparatus of claim 1, wherein at least one of the first and second apertures is between 1 to 3 mm in diameter.

3. The apparatus of claim 1, wherein the first aperture is not centrally positioned within the first cavity.

4. The apparatus of claim 1, wherein the first aperture is centrally positioned on the top surface.

5. The apparatus of claim 1, wherein the second aperture is positioned near an external corner of a second cavity of the plurality of cavities.

6. The apparatus of claim 1, wherein the first aperture is positioned substantially distant from the second aperture.

7. The apparatus of claim 1, wherein the plurality of underside walls form two rows of cavities as the plurality of cavities.

8. The apparatus of claim 1, wherein at least a second cavity of the plurality of cavities collects oils from the produce.

9. The apparatus of claim 8, wherein the oils are collected from ethylene gas generated from the produce.

10. The apparatus of claim 1, wherein the lid further comprises:
a plurality of side walls extending downward from the top.

11. The apparatus of claim 10, wherein a first side wall of the plurality of side walls includes a groove for gripping the first side wall.

12. The apparatus of claim 1, wherein the first cavity operates as a flow cell configured to transfer the first gas from within the apparatus to the atmosphere external to the apparatus.

13. The apparatus of claim 12, wherein the at least one gas is carbon dioxide gas.

14. A system for ripening produce, the system comprising:
a chamber having a plurality of chamber walls integrally coupled to a floor and forming an interior therein for retaining the produce which generates ethylene gas; and
a lid configured to be coupled with the chamber at an upper end thereof, the lid having:
a top having:
a top surface; and
an underside surface;
a plurality of underside walls extending downward from the underside surface and forming a plurality of cavities;
a first aperture extending through the top surface and the underside surface and positioned within a first cavity of the plurality of cavities; and
a second aperture extending through the top surface and the underside surface and positioned to not be in any of the plurality of cavities;
wherein a first gas passing through at least the first and second apertures increases a concentration of the ethylene gas in the system, thereby causing the produce to ripen.

15. The system of claim 14, wherein at least one of the first and second apertures is between 1 to 3 mm in diameter.

16. The system of claim 14, wherein the first aperture is centrally positioned on the top surface.

17. The system of claim 14, wherein the first cavity operates as a flow cell configured to transfer the first gas from within the system to the atmosphere external to the system.

18. The system of claim 17, wherein the first gas is carbon dioxide gas.

19. A method for ripening produce comprising:
providing a chamber having a plurality of chamber walls integrally coupled to a floor and forming an interior therein;
retaining the produce in the chamber;
generating ethylene gas from the produce; and
providing a lid configured to be coupled with the chamber at an upper end thereof, the lid having:
a top having:
a top surface; and
an underside surface;
a plurality of underside walls extending downward from the underside surface and forming a plurality of cavities;
a first aperture extending through the top surface and the underside surface and positioned within a first cavity of the plurality of cavities; and
a second aperture extending through the top surface and the underside surface and positioned to not be in any of the plurality of cavities; and
passing a first gas through at least the first and second apertures, thereby increasing a concentration of the ethylene gas in the system, thereby causing the produce to ripen.

20. The method of claim 19, wherein at least one of the first and second apertures is between 1 to 3 mm in diameter.

* * * * *